(12) United States Patent
Lan (10) Patent No.: US 11,353,078 B2
(45) Date of Patent: Jun. 7, 2022

(54) PLANAR SPRING AND ROTATING SERIES ELASTIC ACTUATOR

(71) Applicant: NATIONAL CHENG KUNG UNIVERSITY, Tainan (TW)

(72) Inventor: Chao-Chieh Lan, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 371 days.

(21) Appl. No.: 16/455,873

(22) Filed: Jun. 28, 2019

(65) Prior Publication Data
US 2020/0158201 A1  May 21, 2020

(30) Foreign Application Priority Data
Nov. 19, 2018  (TW) .................................. 107141085

(51) Int. Cl.
| | |
|---|---|
| F16F 15/073 | (2006.01) |
| F16F 3/02 | (2006.01) |
| H02K 7/06 | (2006.01) |
| H02K 7/116 | (2006.01) |
| F16H 19/08 | (2006.01) |
| F16D 3/12 | (2006.01) |
| H02K 11/21 | (2016.01) |

(52) U.S. Cl.
CPC ................ *F16F 3/023* (2013.01); *F16D 3/12* (2013.01); *F16H 19/08* (2013.01); *H02K 7/06* (2013.01); *H02K 7/116* (2013.01); *H02K 11/21* (2016.01); *F16H 2019/085* (2013.01)

(58) Field of Classification Search
CPC .. F16F 3/023; F16F 1/025; F16F 1/027; F16F 15/1215; F16F 1/185; F16F 1/18; F16F 1/32; F16F 1/3821; F16F 1/328; F16D 3/005; F16D 3/04
See application file for complete search history.

(56) References Cited

U.S. PATENT DOCUMENTS 7,439,641 B2 * 10/2008 Ogino .................... H02K 33/16
                                                             310/12.31

FOREIGN PATENT DOCUMENTS

| | | |
|---|---|---|
| CN | 103836101 A | 6/2014 |
| CN | 106943713 A | 7/2017 |
| CN | 206582265 U | 10/2017 |
| CN | 107614067 A | 1/2018 |
| JP | 2006-201525 A | 8/2006 |

(Continued)

*Primary Examiner* — Randell J Krug
(74) *Attorney, Agent, or Firm* — Bacon & Thomas, PLLC (57) ABSTRACT

A planar spring has an outer ring, an inner ring, and two elastic components. The inner ring is disposed in the outer ring, and forms a space therebetween. The two elastic components are disposed in the space, and are symmetric with respect to a central line at a spaced interval. Each elastic component has an outer connecting portion, an inner connecting portion, and a flexible strip. The outer connecting portion is connected to the outer ring at a first connecting point. The inner connecting portion is connected to the inner ring at a second connecting point. The flexible strip is connected between the outer connecting portion and the inner connecting portion. An included angle between the first connecting point and the second connecting point from the center is greater than or equal to 90 degrees and less than 180 degrees. A rotational series elastic actuator is also provided.

14 Claims, 9 Drawing Sheets

(56) References Cited

FOREIGN PATENT DOCUMENTS

| JP | 2008-55541 A | 3/2008 |
|----|--------------|--------|
| JP | 2010-139067 A | 6/2010 |

* cited by examiner

PLANAR SPRING AND ROTATING SERIES ELASTIC ACTUATOR

BACKGROUND OF THE INVENTION

1. Field of the Invention

The present invention relates to a flat planar spring that may output torque by rotating, and further relates to a rotating series elastic actuator having the planar spring.

2. Description of Related Art

The market demand for a torque transmitting mechanism of an actuator places much emphasis on thinning and lightness of the mechanism. A conventional torsion spring is large in size, lacks a thin planar structure, and thereby fails to be utilized to the torque transmitting mechanism. Moreover, an input end and an output end of the conventional torsion spring are hard to connect a driving shaft of a motor or a reducer. Output torque of the conventional torsion spring between forward and reverse torsions is non-linear, so the conventional torsion spring cannot be utilized to measure torsion precisely.

To solve the above-mentioned size problem, two sorts of conventional planar springs have been provided and will be described hereinafter.

Figure 10:
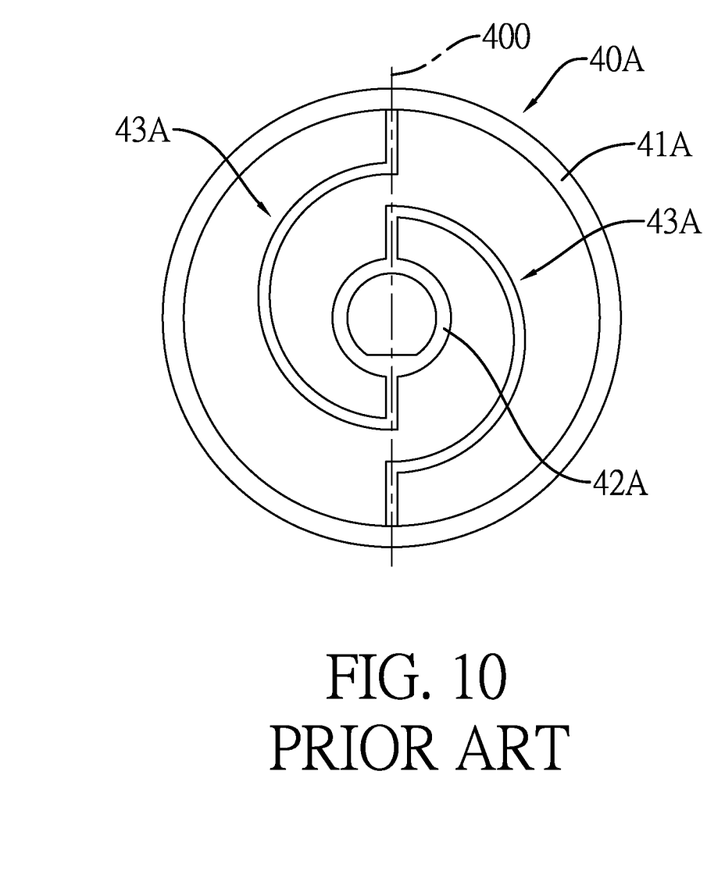
FIG. 10 is a front side view of a first conventional planar spring in accordance with the prior art.
Figure 11:
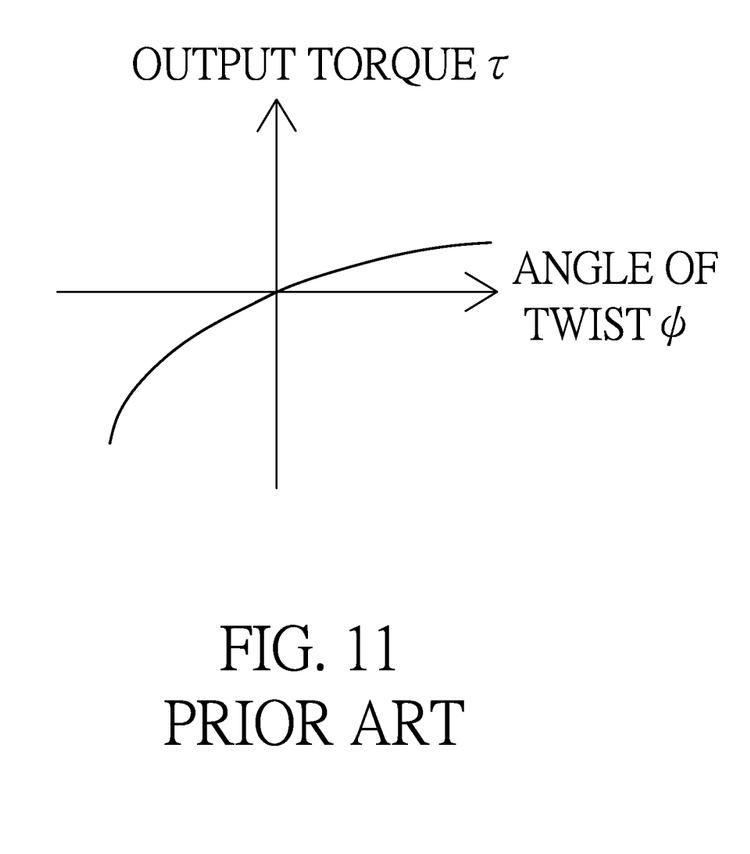
FIG. 11 shows relations of torque versus angles of twist of the first conventional planar spring in FIG. 10.
Figure 12:
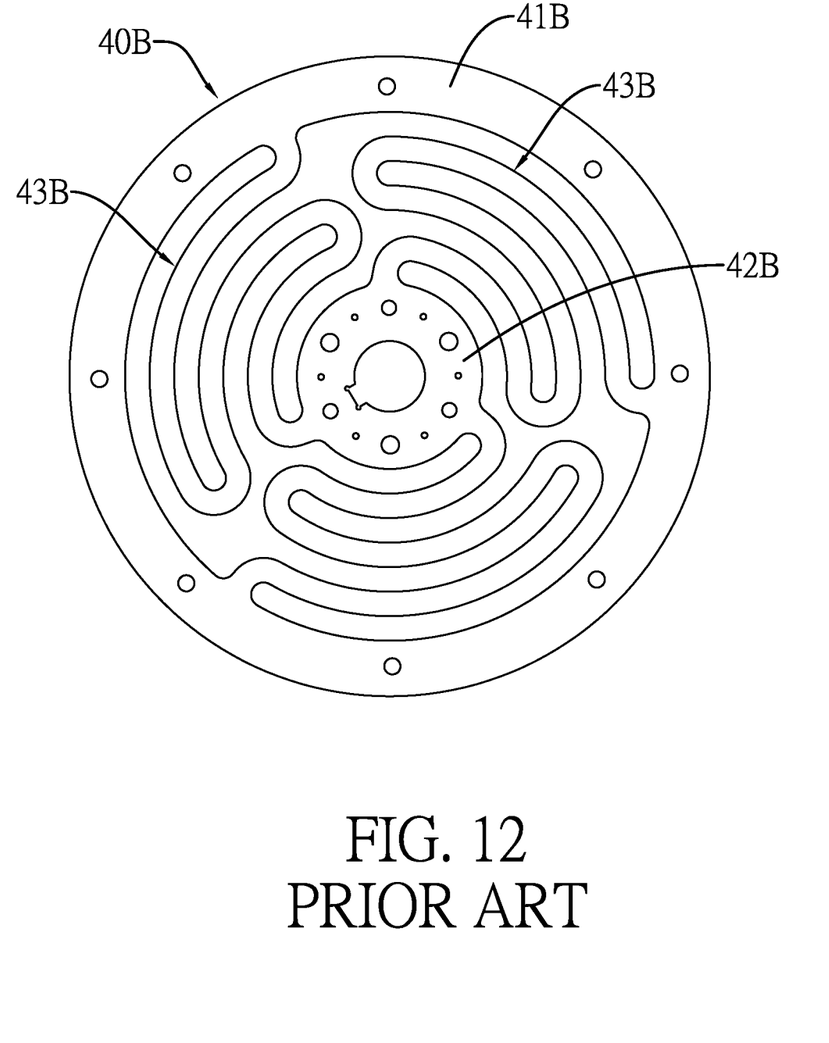
FIG. 12 is a front side view of a second conventional planar spring in accordance with the prior art.

A first sort of the conventional planar spring comprises two configurations. With reference to FIG. 10, a first conventional planar spring 40A has an outer ring 41A, an inner ring 42A, and two elastic components 43A. The two elastic components 43A are spiral and are respectively connected between the outer ring 41A and the inner ring 42A. With reference to FIG. 12, a second conventional planar spring 40B has three elastic components 43B connected between an outer ring 41B and an inner ring 42B. Each elastic component 43B is continuously curved. With reference to FIG. 11, the elastic components 43A, 43B of the first and the second conventional planar springs 40A, 40B have large degrees of deformability, leading to their ability to provide a large range of values of output torque. However, with reference to FIGS. 10 and 12, the elastic components 43A, 43B of the first and the second conventional planar springs 40A, 40B have no reflection symmetry with respect to any axes of symmetry 400 of the inner rings 42A, 42B and the outer rings 41A, 41B. As shown in FIG. 11, a relation between output torque and angles of twist of the conventional planar springs 40A, 40B becomes a curve instead of a line, i.e. the relation is non-linear. Opposite signs of the output torque and the angles of twist are adopted to describe forward and reverse torsions. Due to the non-linear relation, it is difficult to measure values of the output torque precisely. The conventional planar springs 40A, 40B of the first sort are thereby unsuitable to be utilized in fields of robotics and automation.

Figure 13:
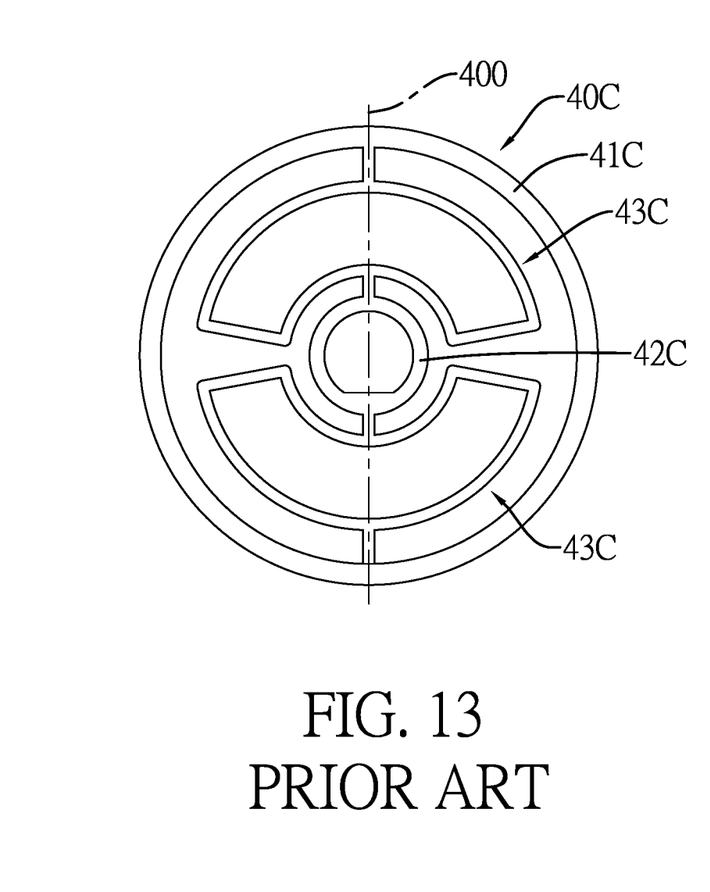
FIG. 13 is a front side view of a third conventional planar spring in accordance with the prior art.
Figure 14:
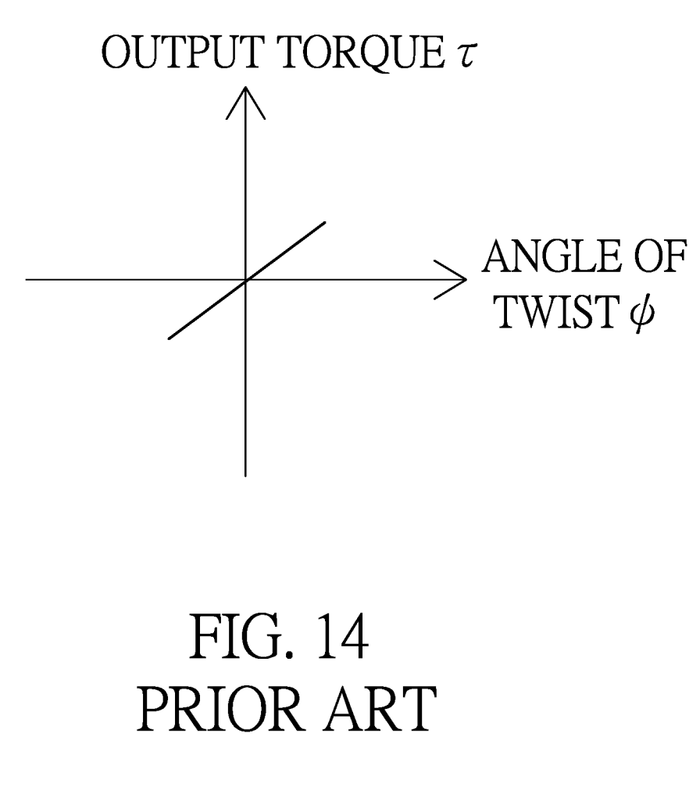
FIG. 14 shows relations of torque versus angles of twist of the third conventional planar spring in FIG. 13.

With reference to FIG. 13 showing a second sort of the conventional planar spring, a third conventional planar spring 40C has an outer ring 41C, an inner ring 42C, and two elastic components 43C. The two elastic components 43C are connected between the outer ring 41C and the inner ring 42C, and are symmetric to each other. Each one of the elastic components 43C has a fan-shaped frame and two ribs. An inner side of the fan-shaped frame is connected to the inner ring 42C with one of the two ribs at a midpoint of the inner side. An outer side of the fan-shaped frame is connected to the outer ring 41C with the other one of the two ribs at a midpoint of the outer side. With reference to FIG. 14, due to reflection symmetries of the two elastic components 43C and each elastic component 43C itself, angles of forward and reverse twists remain linear to the output torque of the third conventional planar spring 40C. In comparison with the first and the second conventional planar springs 40A, 40B, the third conventional planar spring 40C is symmetric with respect to an axis of symmetry 400 of the outer ring 41C and the inner ring 42C, so the third conventional planar spring 40C outputs torque that may be measured precisely. Because the two ribs of each elastic component 43C are connected to the midpoints of the fan-shaped frame, an extent of torsion is therefore strictly limited by the shape of the elastic components 43C. Consequently, the third conventional planar ring 40C cannot sustain a large range of output torque, and is thereby unsuitable to be utilized in the fields of robotics and automation.

To sum up, either one of the two sorts of the conventional planar springs has respective shortcomings, so neither of them may be utilized in the fields of robotics and automation.

SUMMARY OF THE INVENTION

The main objective of the present invention is to provide a planar spring that may provide precisely measurable torque in a large extent of torsion, so as to overcome the shortcomings of the conventional planar springs.

The planar spring of the present invention comprises an outer ring, an inner ring, and two elastic components. The inner ring is disposed in the outer ring, forms a space therebetween, and has a center and a central line extending through the center. The two elastic components are disposed in the space between the outer ring and the inner ring, and are symmetric with respect to the central line of the inner ring at a spaced interval. Each one of the two elastic components has an outer connecting portion, an inner connecting portion, and a flexible strip. The outer connecting portion is connected to an interior circumference of the outer ring at a first connecting point. The inner connecting portion is connected to an exterior circumference of the inner ring at a second connecting point. The flexible strip is connected between the outer connecting portion and the inner connecting portion. An included angle between the first connecting point and the second connecting point from the center of the inner ring is greater than or equal to 90 degrees and less than 180 degrees.

Moreover, a rotational series elastic actuator having the planar spring is provided by the present invention. The rotational series elastic actuator comprises a driving assembly, a loading shaft, the planar spring as abovementioned, a first angle measurer, and a second angle measurer. The driving assembly has a driving shaft. The loading shaft is disposed parallel to the driving shaft. The inner ring of the planar spring is connected to the driving shaft, and the outer ring of the planar spring is connected to the loading shaft. The first angle measurer is disposed beside the driving assembly measure changes in an angle of the driving shaft. The second angle measurer is disposed beside the loading shaft to measure changes in an angle of the loading shaft.

Other objectives, advantages and novel features of the invention will become more apparent from the following detailed description when taken in conjunction with the accompanying drawings.

DETAILED DESCRIPTION OF THE PREFERRED EMBODIMENT

The present invention comprises a planar spring and a rotating series elastic actuator having the planar spring. With reference to FIGS. 1 and 3 to 6, the present invention comprises five embodiments of the planar spring 1A, 1B, 1C, 1D, 1E. In each embodiment, the planar spring 1A, 1B, 1C, 1D, 1E has an outer ring 10, an inner ring 20, and two elastic components 30A, 30B, 30C, 30D, 30E.

Figure 1:
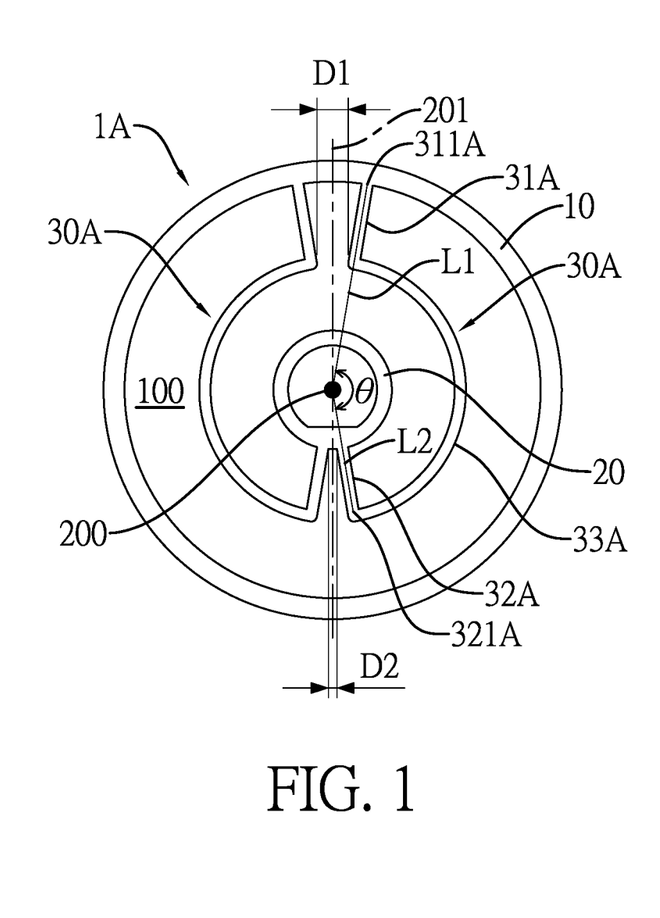
FIG. 1 is a front side view of a first embodiment of a planar spring in accordance with the present invention.

The outer ring 10 is planar. With reference to FIG. 1, the inner ring 20 is disposed in and is rotatable relative to the outer ring 10, and a space 100 is formed between the inner ring 20 and the outer ring 10. The inner ring 20 has a center 200 and a central line 201 extending through the center 200.

With reference to FIGS. 1 and 3 to 6, the two elastic components 30A, 30B, 30C, 30D, 30E of each embodiment are disposed in the space 100 between the two rings 10, 20, and are symmetric to each other with respect to the central line 20 at a spaced interval. Each one of the two elastic components 30A, 30B, 30C, 30D, 30E has an outer connecting portion 31A, 31B, 31C, 31D, 31E, an inner connecting portion 32A, 32B, 32C, 32D, 32E, and a flexible strip 33A, 33B, 33C, 33D, 33E. The flexible strip 33A, 33B, 33C, 33D, 33E is connected between the outer connecting portion 31A, 31B, 31C, 31D, 31E and the inner connecting portion 32A, 32B, 32C, 32D, 32E.

As an example for description, with reference to FIG. 1, the two outer connecting portions 31A of the two elastic components 30A are spaced from each other at a first interval D1. The two inner connecting portions 32A of the two elastic components 30A are spaced from each other at a second interval D2. The two outer connecting portions 31A are each connected to an interior circumference of the outer ring 10 at a respective first connecting point 311A. The two inner connecting portions 32A are each connected to an exterior circumference of the outer ring 20 at a respective second connecting point 321A. Furthermore, the center 200 of the inner ring 20 and the first connecting point 311A constitute a first line L1, and the center of the inner ring 20 and the second connecting point 321A constitute a second line L2. Between the first line L1 and the second line L2 an included angle θ is formed, and the included angle θ is greater than or equal to 90 degrees and less than 180 degrees. In the present invention, the second to the fifth embodiments have the same technical features.

With reference to FIG. 1, the flexible strip 33A of each elastic component 30A is arc-shaped. With reference to FIGS. 3 to 6, the flexible strip 33B, 33C, 33D, 33E of each elastic component 30B, 30C, 30D, 30E has one or multiple U-shaped portions 331B, 331C, 331D, 331E disposed at spaced intervals. Each U-shaped portion 331B, 331C, 331D, 331E projects outward away from the center 200 of the inner ring 20 toward the outer ring 10.

Besides, with reference to FIGS. 3 to 6, the outer connecting portion 31B, 31C, 31D, 31E of each one of the two elastic components 30B, 30C, 30D, 30E further comprises a U-shaped segment 311B, 3110, 311D, 311E formed thereon. The two U-shaped segments 311B, 311C, 311D, 311E of the two elastic components 30B, 30C, 30D, 30E project in opposite directions away from each other.

Figure 6:
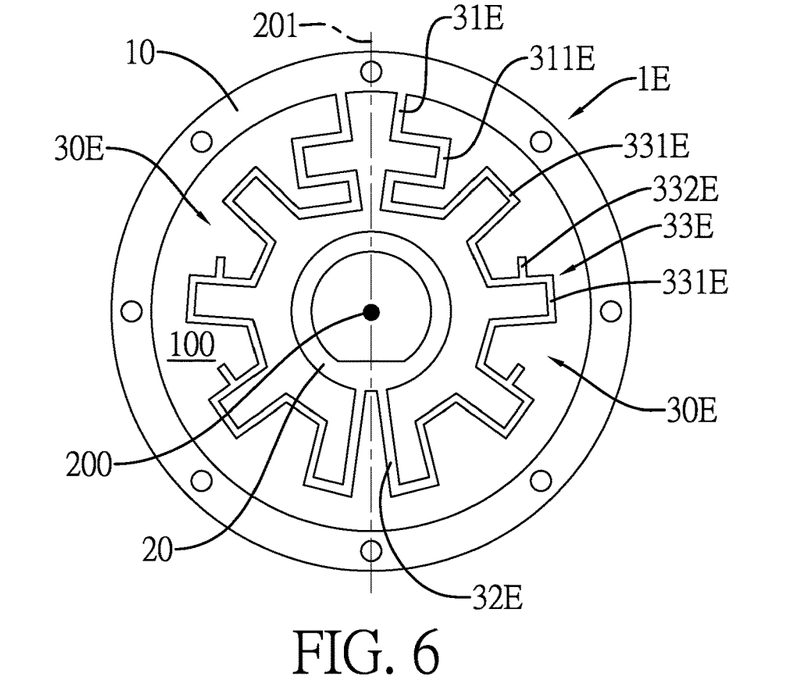
FIG. 6 is a front side view of a fifth embodiment of a planar spring in accordance with the present invention.

With reference to FIG. 6, each elastic component 30E of the planar spring 1E of the fifth embodiment further comprises two protrusions 332E. Each one of the two protrusions 332E is protruded on one of the U-shaped portions 331E toward an adjacent one of the rest of the U-shaped portions 331. Thereby the protrusions 332E provide a restriction to deformation of the two elastic components 30E under torsion, in order to prevent the U-shaped portions 331 from contacting each other in the process of elastic deformation.

The foregoing paragraphs only illustrate preferred embodiments with five configurations of the elastic components 30A, 30B, 30C, 30D 30E. Changes may be made to the configurations of the elastic components 30A, 30B, 30C, 30D, 30E. The planar spring 1A, 1B, 1C, 1D, 1E may have a wider range of output torque and angles of twist with a more complicated configuration of the two elastic components 30A, 30B, 30C, 30D, 30E.

Figure 2:
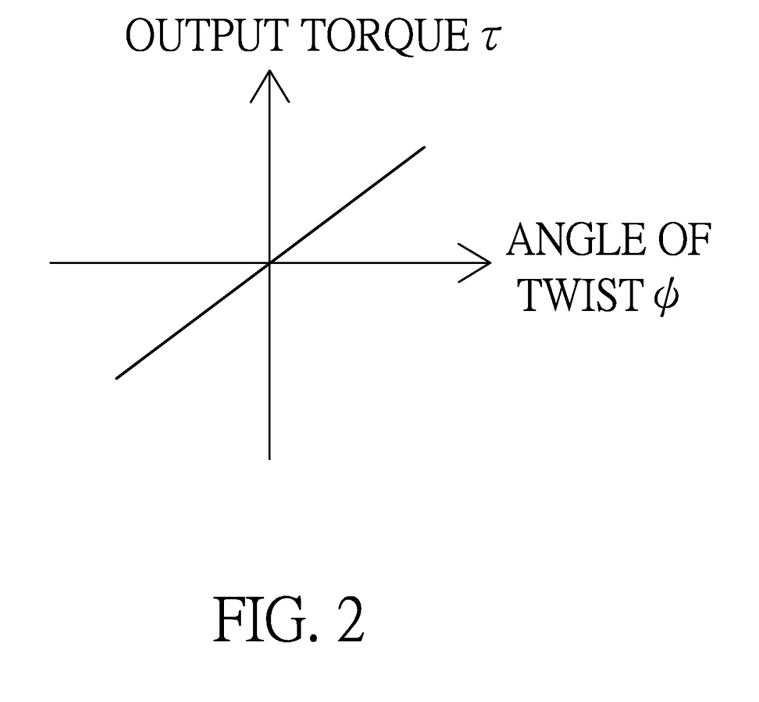
FIG. 2 shows relations of torque versus angles of twist of the planar spring in FIG. 1.
Figure 3:
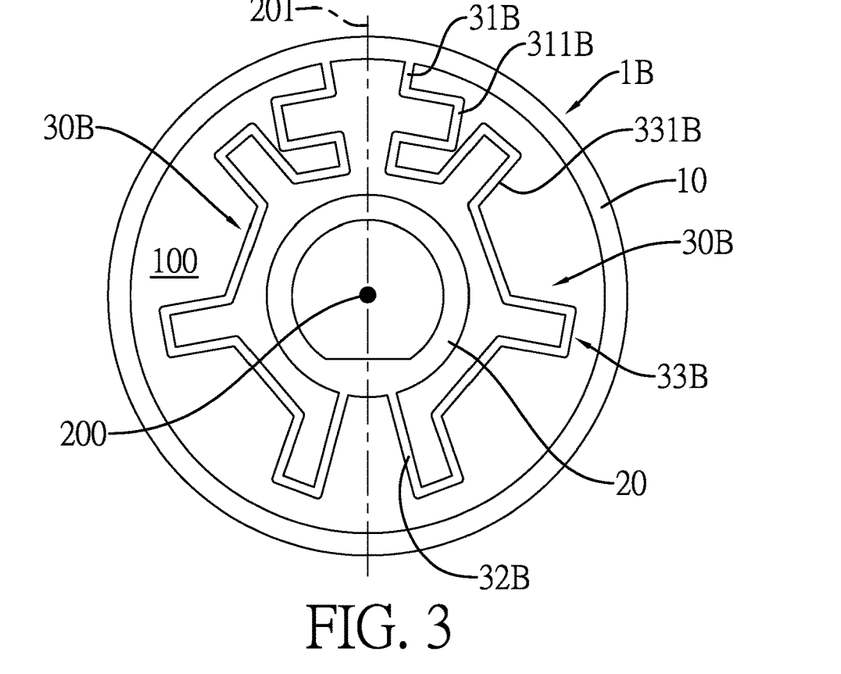
FIG. 3 is a front side view of a second embodiment of a planar spring in accordance with the present invention.
Figure 4:
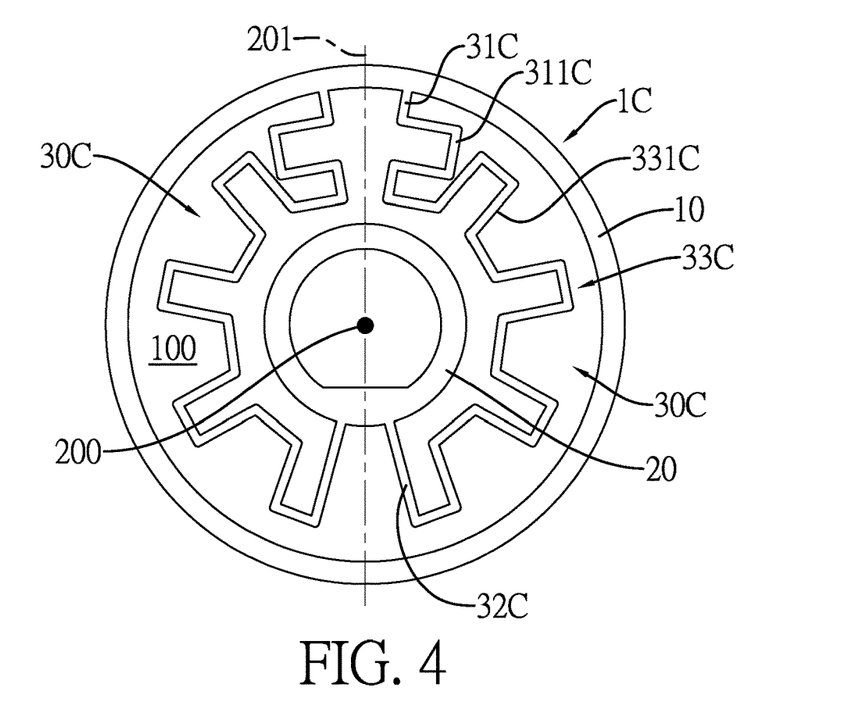
FIG. 4 is a front side view of a third embodiment of a planar spring in accordance with the present invention.
Figure 5:
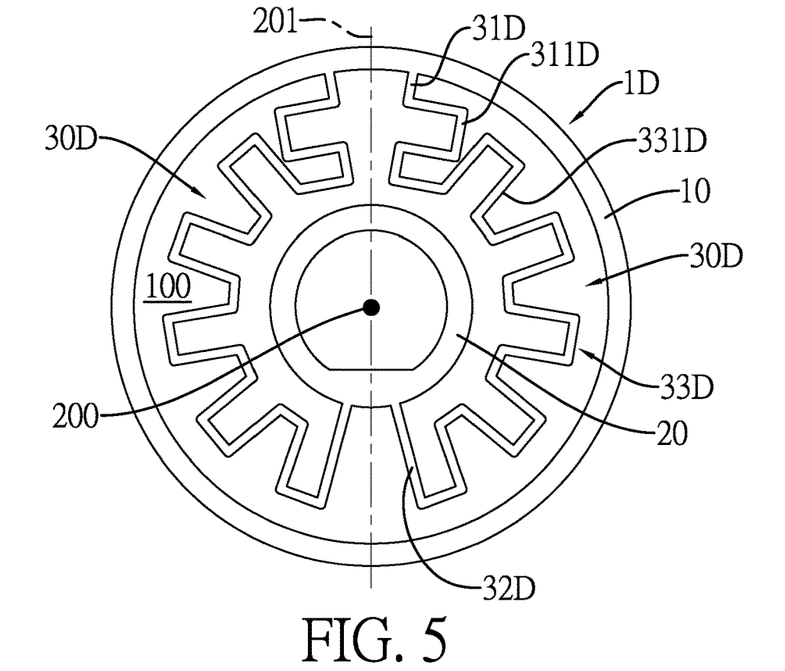
FIG. 5 is a front side view of a fourth embodiment of a planar spring in accordance with the present invention.

The planar springs 1A, 1B, 1C, 1D, 1E described above may serve as a spring of a rotational elastic actuator, or be applied to fields which require high precision, such as robotics and automation. By measuring the angle of twist of the planar spring 1A, 1B, 1C, 1D, 1E, the output torque of the planar spring 1A, 1B, 1C, 1D, 1E may be calculated with known stiffness of the planar spring 1A, 1B, 1C, 1D, 1E, and the output torque may be controlled. With reference to FIGS. 1 and 2, due to reflection symmetry of the two elastic components 30A with respect to the central line 201, the included angle θ between 90 and 180 degrees, and the non-symmetric configuration of each elastic component 30A, the planar spring 1A may keep the angle of twist and the output torque linearly relevant in a large range. As a result, from the linear relation between the angle of twist and the output torque, the output torque of the planar spring 1A may be precisely calculated.

Figure 7:
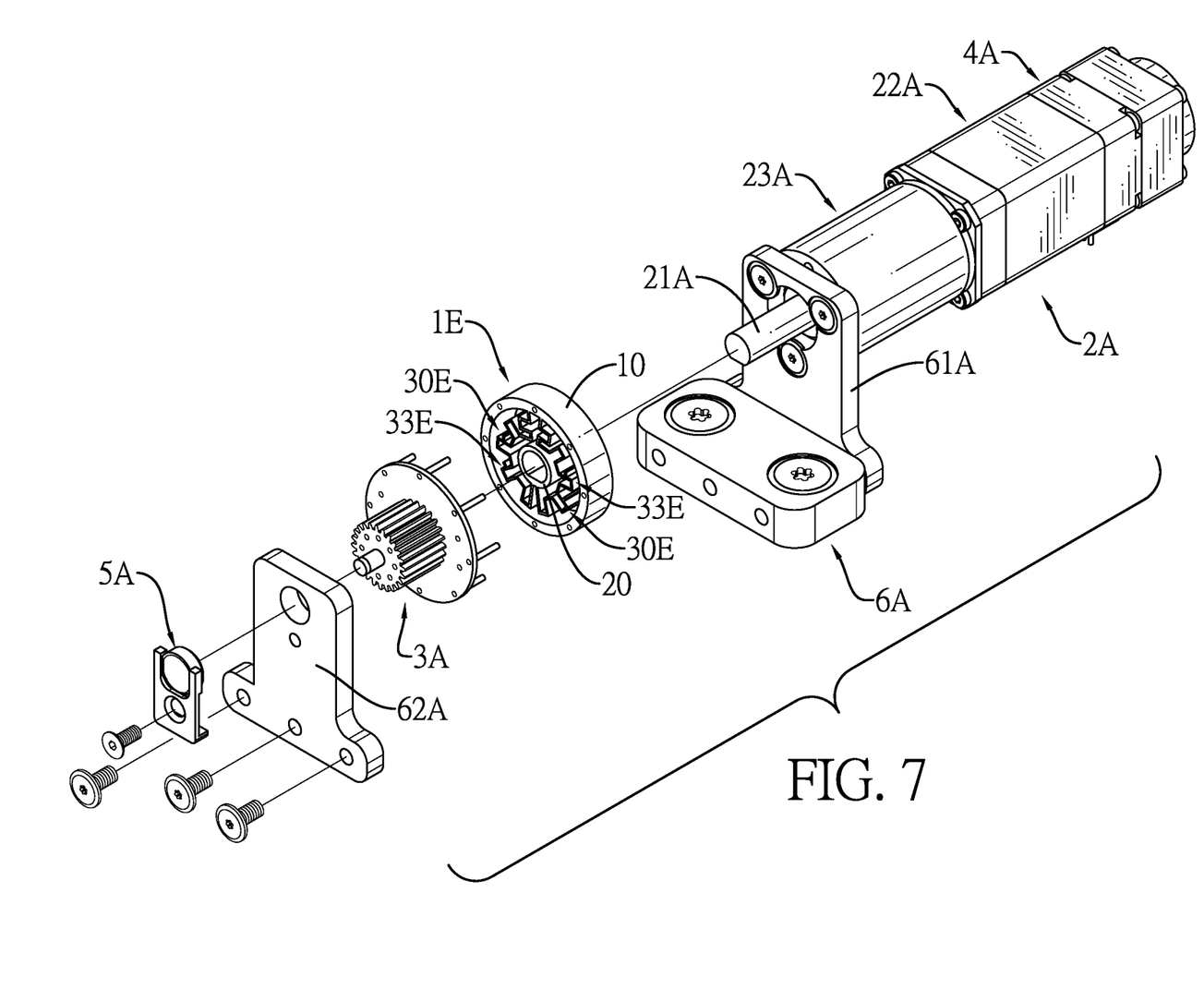
FIG. 7 is an exploded perspective view of a rotating series elastic actuator in accordance with the present invention.
Figure 8:
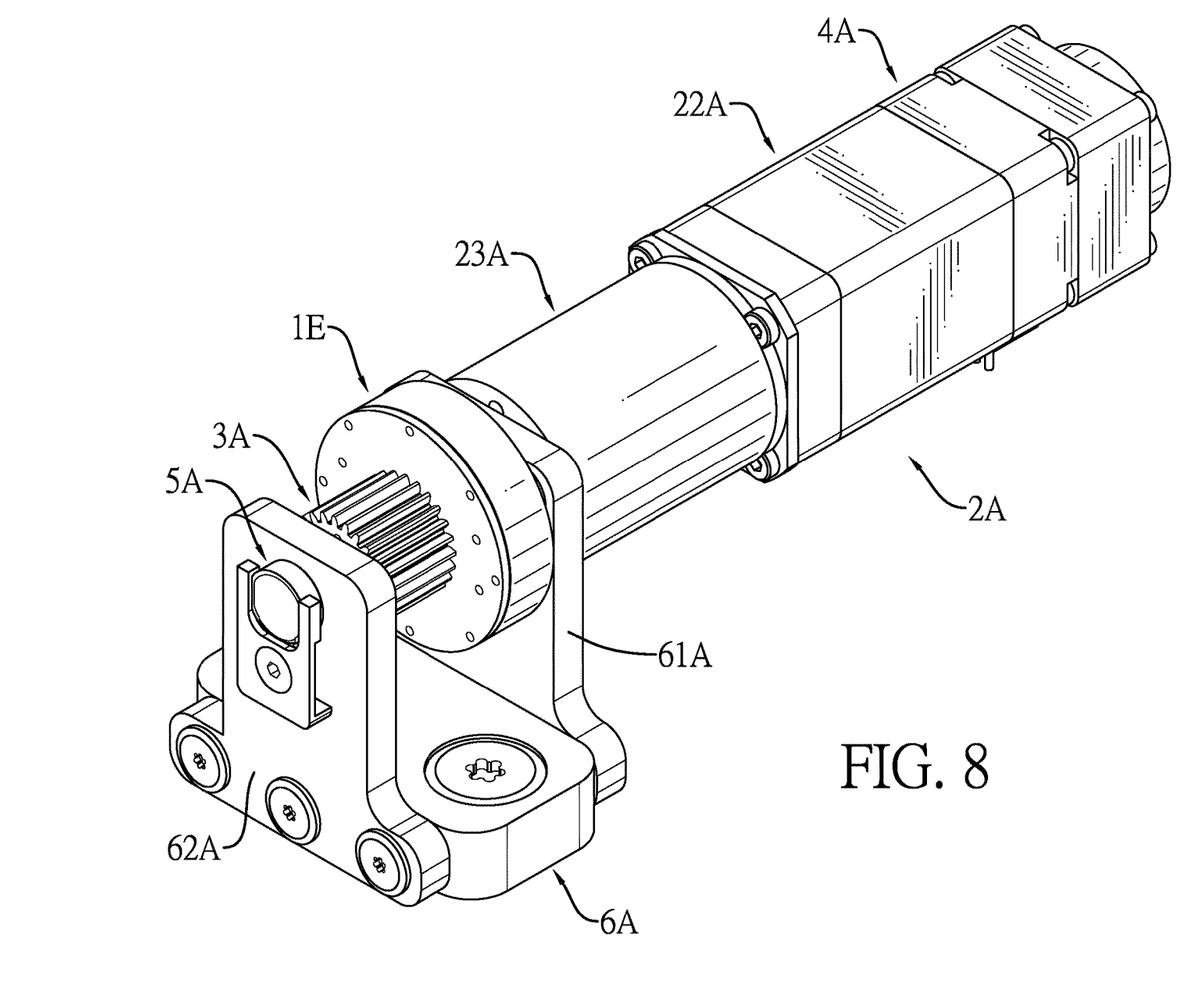
FIG. 8 is a perspective view of the rotating series elastic actuator in FIG. 7.
Figure 9:
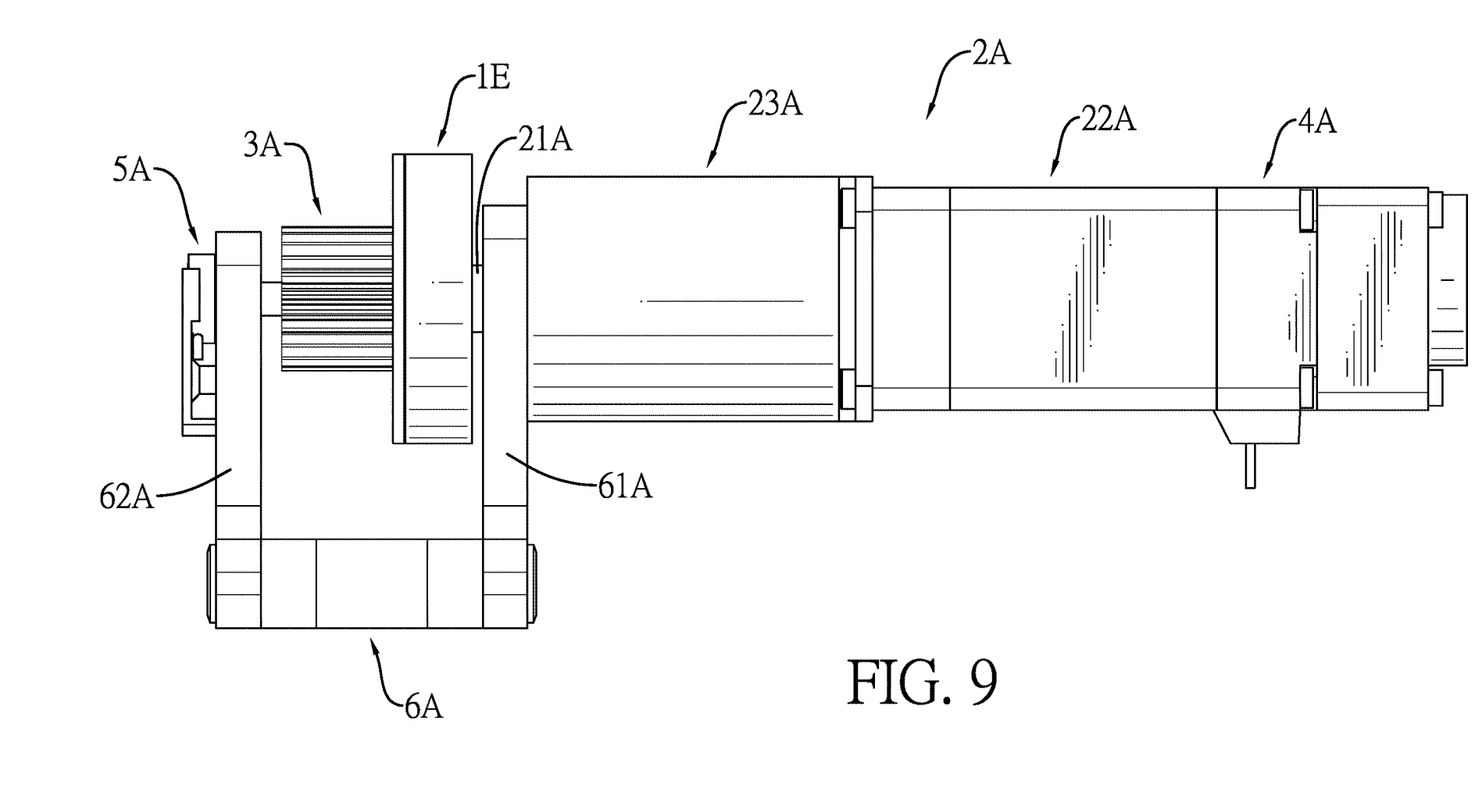
FIG. 9 is a side view of the rotating series elastic actuator in FIG. 7.

With reference to FIGS. 7 to 9, the present invention provides a rotational series elastic actuator having the planar spring. The rotational series elastic actuator has a driving assembly 2A, a loading shaft 3A, a planar spring 1E, a first angle measurer 4A, and a second angle measurer 5A. The planar spring 1E may be replaced with an one of the embodiments described above.

The driving assembly 2A has a driving shaft 21A connected with the inner ring 20 of the planar ring 1E. In the present invention, the driving assembly 2A further comprises a motor 22A and a gear reducer 23A. The motor 22A has a motor shaft. The driving shaft 21A is connected to the inner ring 20 of the planar spring 1E, and is connected to the motor shaft of the motor 22A via the gear reducer 23A.

The loading shaft 3A as an output shaft is disposed parallel to the driving shaft 21A, and is connected to the outer ring 10 of the planar spring 1E The loading shaft 3A and the driving shaft 21A are coaxially aligned.

The first angle measurer 4A and the second angle measurer 5A may be encoders or other apparatuses that can measure changes in angles. The first angle measurer 4A is disposed beside the driving assembly 2A to measure or calculate angular changes of the driving shaft 21A or angular changes of the motor shaft of the motor 22A. The second angle measurer 5A is disposed beside the loading shaft 3A, so as to measure angular Changes of the loading shaft 3A. The angle of the twist of the planar spring 1E is calculated from a difference between the angular changes of the driving shaft 21A and the angular changes of the loading shaft 3A, and thereby the output torque via the loading shaft 3A may be precisely controlled.

With reference to FIGS. 7 to 9, the rotational series elastic actuator further comprises a base 6A. The driving assembly 2A and the loading shaft 3A are respectively assembled on the base 6A. The base 6A comprises a first mounting board 61A and a second mounting board 62A disposed at a spaced interval. The driving assembly 2A is mounted to the first mounting board 61A, and the loading shaft 3A is rotatably mounted to the second mounting board 62A. The second angle measurer 5A is mounted on the second mounting board 62A as well in order to measure rotations of the loading shaft 3A.

With the aforementioned technical characteristics, due to reflection symmetry of the two elastic components 30A, 30B, 30C, 30D, 30E, the included angle θ within 90 to 180 degrees, and the non-symmetric configuration of each elastic component 30A, 30B, 30C, 30D, 30E, the output torque may be precisely calculated using Hooke's Law. Therefore, the present invention has the following advantages:

1. The linear relation of the angle of twist and the output torque is maintained in a large range, and torque measurement is thereby precise.

2. As long as the two elastic components 30A, 30B, 30C, 30D, 30E are symmetric with respect to the central line 201 of the inner ring 20, and each elastic component 30A, 30B, 30C, 30D, 30E has a non-symmetric configuration, changes in configuration of the elastic components 30A, 30B, 30C, 30D, 30E may be implemented. Thus the planar spring 1A, 1B, 1C, 1D, 1E is compatible with different conditions of usage.

3. The planar spring 1A, 1B, 1C, 1D, 1E is applicable in the fields of robotics and automation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A planar spring comprising:
    an outer ring;
    an inner ring disposed in the outer ring, forming a space therebetween, and having
        a center; and
        a central line extending through the center of the inner ring; and
    two elastic components disposed in the space between the outer ring and the inner ring, and being symmetric with respect to the central line of the inner ring at a spaced interval, each one of the two elastic components having
        an outer connecting portion connected to an interior circumference of the outer ring at a first connecting point;
        an inner connecting portion connected to an exterior circumference of the inner ring at a second connecting point; and
        a flexible strip connected between the outer connecting portion and the inner connecting portion;
    wherein
        an included angle between the first connecting point and the second connecting point from the center of the inner ring is greater than or equal to 90 degrees and less than 180 degrees; and
        the flexible strip of each one of the two elastic components has multiple U-shaped portions disposed at spaced intervals, and each one of the multiple U-shaped portions projects toward the outer ring.

2. The planar spring as claimed in claim 1, wherein each one of the two elastic components has a protrusion protruded on one of the multiple U-shaped portions toward an adjacent one of the rest of the multiple U-shaped portions.

3. The planar spring as claimed in claim 1, wherein the outer connecting portion of each one of the two elastic components has a U-shaped segment, and the two U-shaped segments of the two elastic components project away from each other.

4. The planar spring as claimed in claim 3, wherein each one of the two elastic components has a protrusion protruded on one of the multiple U-shaped portions toward an adjacent one of the rest of the multiple U-shaped portions.

5. The planar spring as claimed in claim 1, wherein the two outer connecting portions of the two elastic components are spaced from each other at a first interval, and the two inner connecting portions of the two elastic components are spaced from each other at a second interval.

6. The planar spring as claimed in claim 5, wherein each one of the two elastic components has a protrusion protruded on one of the multiple U-shaped portions toward an adjacent one of the rest of the multiple U-shaped portions.

7. The planar spring as claimed in claim 5, wherein the outer connecting portion of each one of the two elastic components has a U-shaped segment, and the two U-shaped segments of the two elastic components project away from each other.

8. The planar spring as claimed in claim 7, wherein each one of the two elastic components has a protrusion protruded on one of the multiple U-shaped portions toward an adjacent one of the rest of the multiple U-shaped portions.

9. A rotational series elastic actuator comprising:
    a driving assembly having a driving shaft;
    a loading shaft disposed parallel to the driving shaft;
    the planar spring as claimed in claim 1, wherein the inner ring is connected to the driving shaft, and the outer ring is connected to the loading shaft;
    a first angle measurer disposed beside the driving assembly to measure changes in an angle of the driving shaft;
    a second angle measurer disposed beside the loading shaft to measure changes in an angle of the loading shaft.

10. The rotational series elastic actuator as claimed in claim 9, wherein the first angle measurer and the second angle measurer are encoders.

11. The rotational series elastic actuator as claimed in claim 9 further comprising a base, wherein the driving assembly and the loading shaft are respectively assembled on the base.

12. The rotational series elastic actuator as claimed in claim 9, wherein the driving assembly has a motor and a gear reducer, and the driving shaft is connected to the motor via the gear reducer and is connected to the inner ring of the planar ring.

13. The rotational series elastic actuator as claimed in claim 12, wherein the first angle measurer and the second angle measurer are encoders.

14. The rotational series elastic actuator as claimed in claim 12 further comprising a base, wherein the driving assembly and the loading shaft are respectively assembled on the base.

* * * * *